United States Patent [19]

Olsen

[11] Patent Number: 5,779,384
[45] Date of Patent: Jul. 14, 1998

[54] WINDOW FRAME WELDING METHOD AND PRODUCT THEREOF

[75] Inventor: Carl James Olsen, Hudson, Wis.

[73] Assignee: Andersen Corporation, Bayport, Minn.

[21] Appl. No.: 649,577

[22] Filed: May 17, 1996

[51] Int. Cl.$^6$ .................................................. F16B 5/08
[52] U.S. Cl. .................. 403/231; 403/270; 403/265; 160/381; 52/208; 52/204.55; 49/DIG. 2
[58] Field of Search ....................... 403/269, 270, 403/265, 266, 231, 401, 402; 52/210, 208, 204.55; 160/381; 49/504, DIG. 2

[56] References Cited

U.S. PATENT DOCUMENTS

| | | | |
|---|---|---|---|
| 3,598,433 | 8/1971 | Savickas | 403/289 X |
| 3,602,257 | 8/1971 | Berleyoung et al. | 403/270 X |
| 3,917,204 | 11/1975 | Himsl | 403/231 X |
| 4,090,799 | 5/1978 | Crotti et al. | 403/401 |
| 4,224,091 | 9/1980 | Sager | 403/401 X |
| 4,391,054 | 7/1983 | Schovee | 403/401 X |
| 4,747,248 | 5/1988 | Fahs | 403/401 X |
| 4,856,230 | 8/1989 | Slocomb | 52/656.5 X |
| 4,955,740 | 9/1990 | Renz et al. | 403/270 X |
| 4,987,709 | 1/1991 | Bucci | 403/401 X |
| 5,263,606 | 11/1993 | Dutt et al. | 403/270 X |
| 5,491,940 | 2/1996 | Bruchu | 52/745.16 X |
| 5,687,519 | 11/1997 | Bruchu | 52/745.16 X |

FOREIGN PATENT DOCUMENTS

| 1453929 | 10/1976 | United Kingdom | 403/231 |

*Primary Examiner*—Harry C. Kim
*Attorney, Agent, or Firm*—Merchant, Gould, Smith, Edell, Welter & Schmidt, P.A.

[57] ABSTRACT

A frame member is extruded from a composite material including plastic and wood fiber. A plastic end cap is sonically welded to a cut end of the frame member despite the presence of wood fiber at the interface.

4 Claims, 4 Drawing Sheets

5,779,384

WINDOW FRAME WELDING METHOD AND PRODUCT THEREOF

FIELD OF THE INVENTION

The present invention relates to windows and doors and in particular, to a method of welding plastic parts together to make a frame for a window or door suitable for exposure to the environment.

BACKGROUND OF THE INVENTION

Exterior doors and windows are designed with insulation, weather resistance, and aesthetics in mind. As a result, most such products are provided with a durable outer coating, such as vinyl, metal, or paint. However, difficulties may be encountered when attempting to coat or otherwise seal joints or seams between adjacent window frame components. In this regard, there exists a need to effectively seal cut and/or exposed ends of extruded window frame members and/or interfaces therebetween. When adjacent window frame members are made of plastic, sonic welding has been used to form a bond therebetween. However, room for improvement remains for both the process and the resulting product.

SUMMARY OF THE INVENTION

The present invention provides a method for covering or sealing the cut or exposed end of an extruded frame member having sidewalls disposed about a hollow interior. In one application, a window frame member is extruded from a material including plastic and wood fiber. When the window frame member is cut to length, some of the wood fibers are present and/or exposed at the cut end. The wood fibers tend to interfere with sonic welding of a plastic end cap to the cut end. To overcome this problem, energy directors on the end cap are disposed in perpendicular planes, one of which extends parallel to the cut end, and the other of which extends perpendicular thereto. The parallel energy directors form a bond with the cut end, and the perpendicular energy directors form a bond with the sidewalls of the window frame member. The sidewalls are extruded, as opposed to cut, and thus, are better suited to form a sonic weld interface. The resulting bond or weld is superior to that formed by conventional processes and/or solely with the cut end of the composite material extrusion.

BRIEF DESCRIPTION OF THE DRAWING

With reference to the Figures of the Drawing, wherein like numerals represent like parts and assemblies throughout the several views.

DETAILED DESCRIPTION OF THE PREFERRED EMBODIMENT

Figure 1:
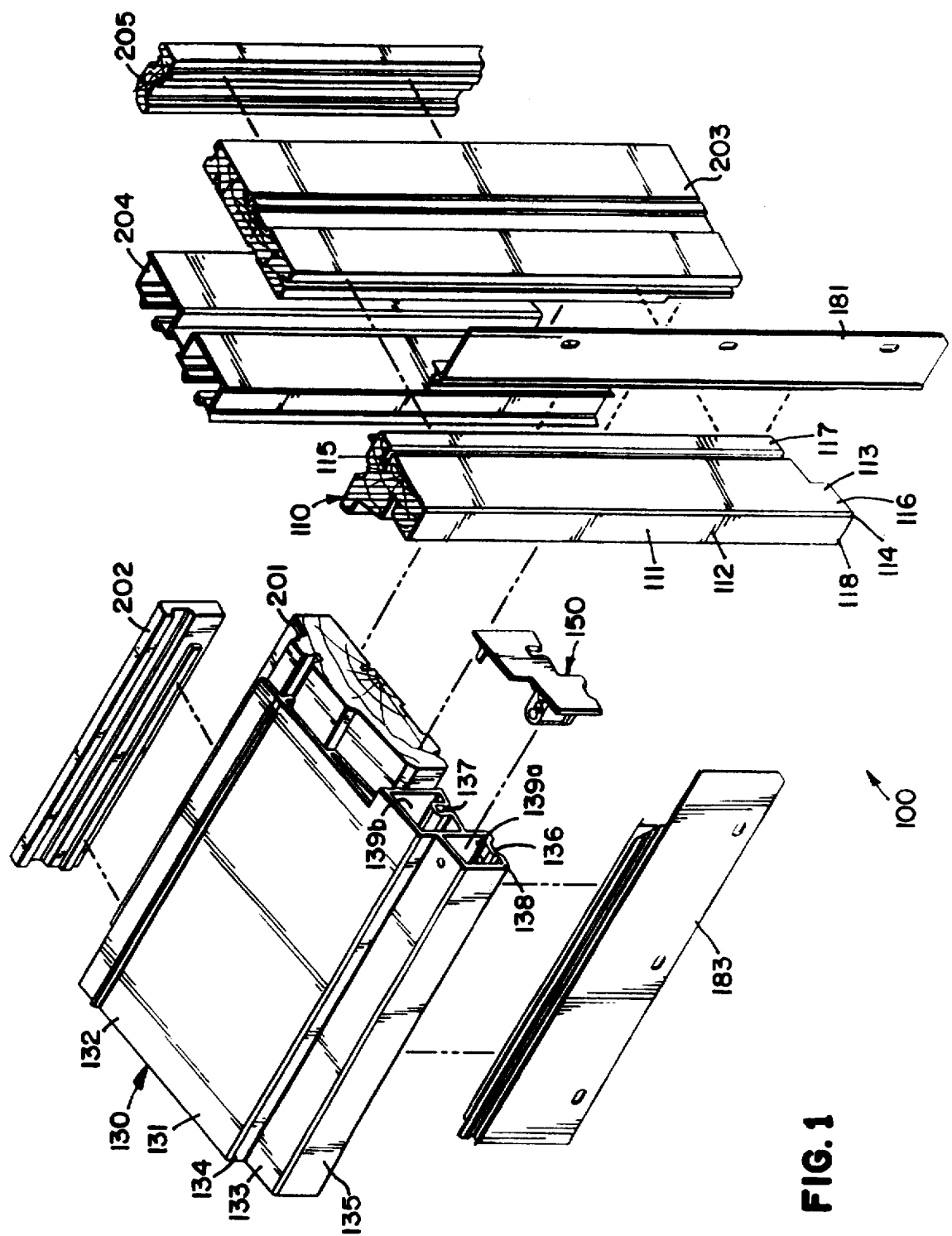
FIG. 1 is an exploded perspective view of a window frame corner constructed according to the principles of the present invention.
Figure 2:
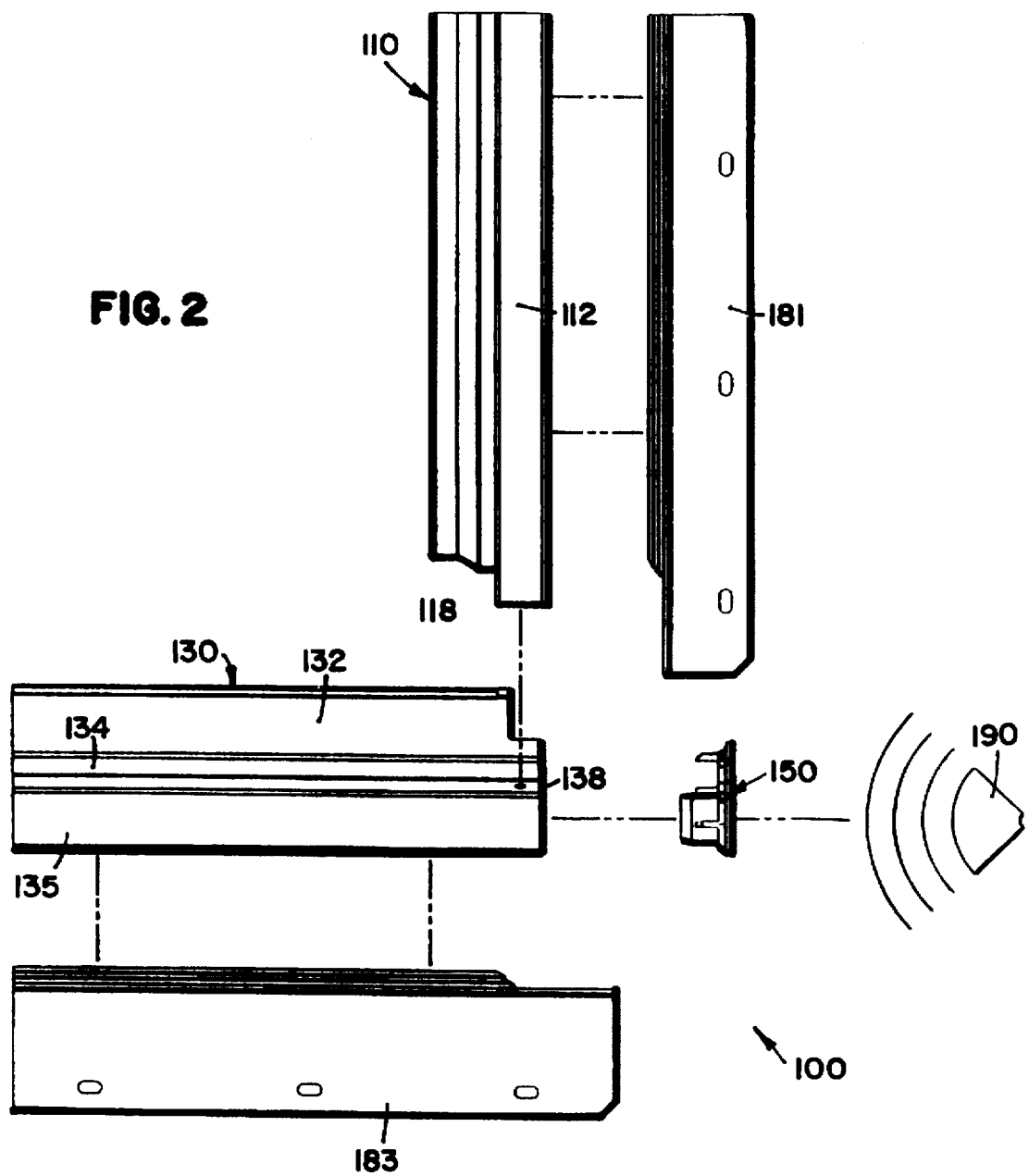
FIG. 2 is an exploded exterior view of the window frame corner of FIG. 1.
Figure 3:
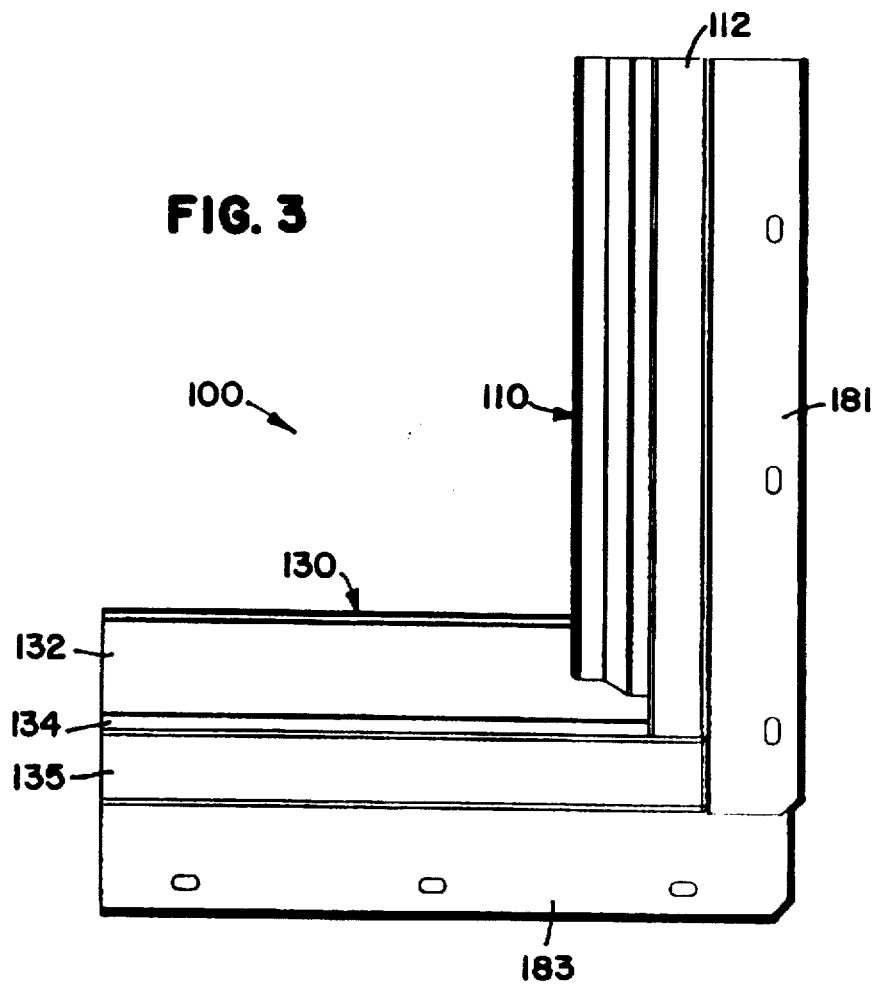
FIG. 3 is an assembled exterior view of the window frame corner of FIG. 1.
Figure 4:
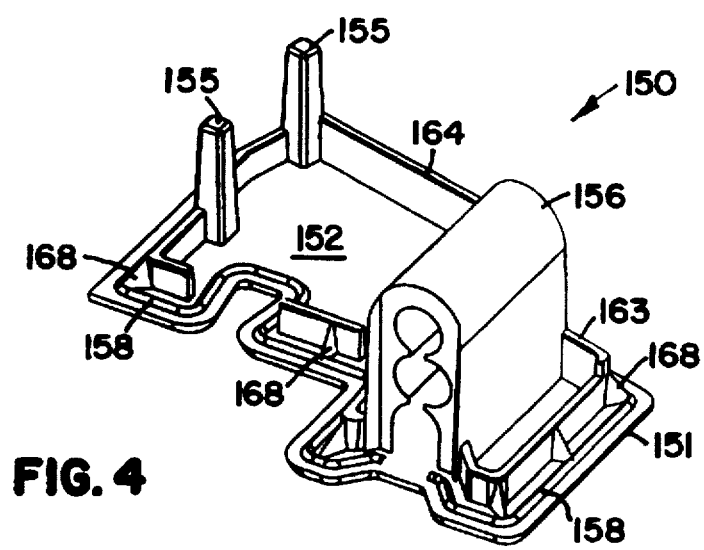
FIG. 4 is a perspective view of an end cap which is part of the window frame corner of FIGS. 1-3.
Figure 5:
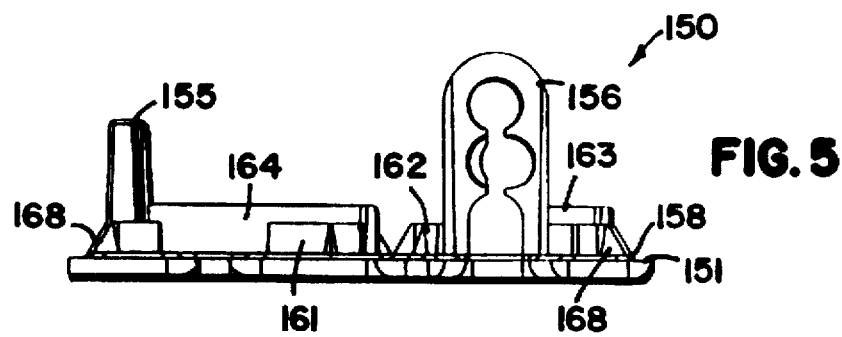
FIG. 5 is a top view of the end cap of FIG. 4.
Figure 6:
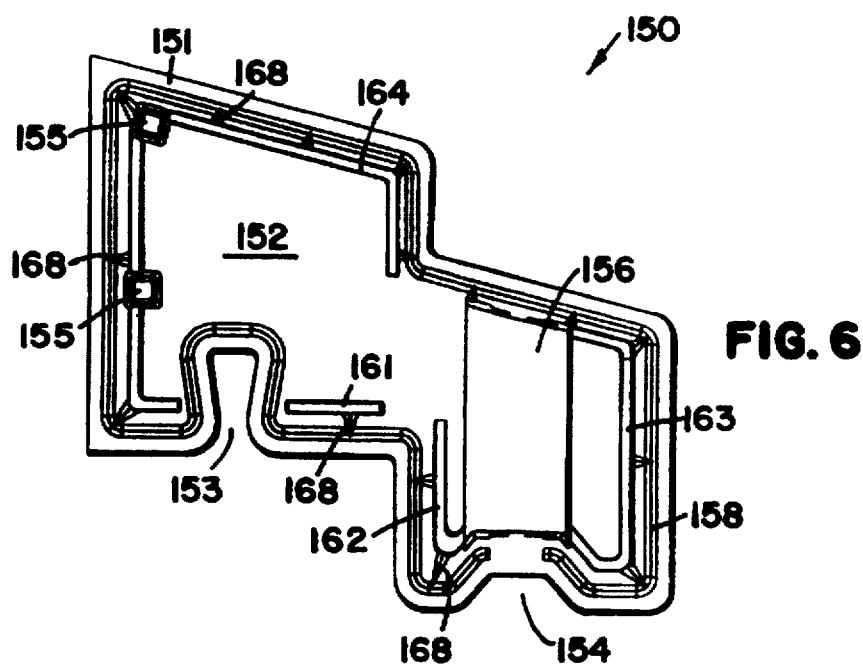
FIG. 6 is an interior side view of the end cap of FIG. 4.
Figure 7:
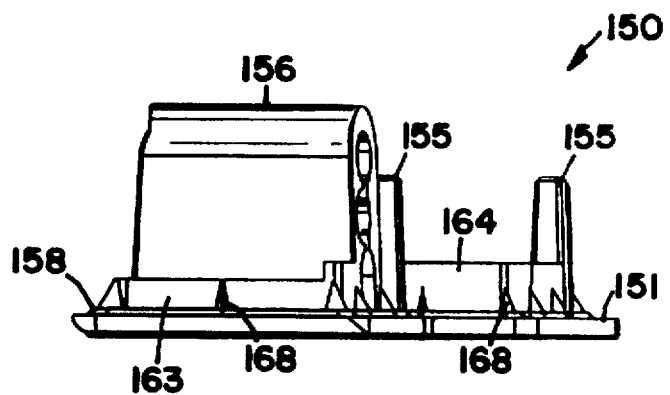
FIG. 7 is an exterior end view of the end cap of FIG. 4.

A preferred embodiment window frame joint or corner constructed according to the principles of the present invention is designated as 100 in FIGS. 1-3. The exterior portion of the corner 100 is formed by a first (or side) outer frame member 110, a second (or sill) frame member 130, and a corner member 150.

The remainder of the window corner 100 includes: a sill base 201 which is made of wood and underlies the second frame member or sill cover 130; an interior sill stop 202 which is made of wood (or foamed PVC) and covers the interior interface between the sill base 201 and the sill cover 130; a side jamb 203 which is made of wood and is adjacent an interior facing portion of the outer frame member 110; a side liner 204 which is made of polyvinyl chloride and is secured inside the side jamb 203; and an interior side stop 205 which is made of wood (or foamed PVC) and covers the interface between the side jamb 203 and the side liner 204. The side liner 204 cooperates with a counterpart on an opposite side of the window to support a pair of window sashes within the window frame.

Both frame members 110 and 130 may be said to be elongate, and each has a uniform cross-section or profile. The side frame member 110 has a wood core encased in PVC. Generally speaking, the wood core provides structural rigidity, and the PVC coating or shell provides resistance to wear. The sill frame member 130 is an extrusion of a composite material including plastic and wood fibers, which is the subject of U.S. patent application Ser. No. 07/938,364, filed by Michael J. Deaner et al. on Aug. 31, 1992, which was continued as Ser. No. 08/224,396 on Apr. 7, 1994. Other U.S. patent applications directed to this composite material include Ser. No. 07/938,365, filed by Michael J. Deaner et al. on Aug. 31, 1992, which was continued as Ser. No. 08/224,399 on Apr. 7, 1994; Ser. No. 08/017,240 filed by Michael J. Deaner et al. on Feb. 12, 1993; and Ser. No. 07/938,604, filed by Giuseppe Puppin et al. on Sep. 1, 1992. These applications are owned by the assignee of the present invention and are incorporated herein by reference.

The side frame member 110 has an outer or exposed surface 111 which includes a first surface 112 and a second surface 113. The first surface 112 may be described as facing outside (parallel to the glass component of the window), and the second surface 113 may be described as facing laterally (perpendicular to the first surface 112). The first surface 112 and the second surface 113 join to form a corner 114 which extends lengthwise along the side frame member 110. A groove 115 in the second surface 113 extends lengthwise along the side frame member 110 and divides the second surface 113 into a relatively exterior portion 116 and a relatively interior portion 117. The groove 115 is sized and configured to receive a nailing flange 181. The side frame member 110 terminates in a lower end 118 which is cut to generally match the contour of the sill frame member 130.

The sill frame member 130 has an outer or exposed surface or wall 131 which includes an upper sill surface or wall 132 and a lower sill surface or wall 133. A set-off surface or wall 134 extends generally perpendicularly between the generally horizontal sill surfaces 132–133. An outermost surface or wall 135 extends generally downward from the lower sill surface 133. The sill surfaces 132–133 may be described as facing upward (generally perpendicular to the glass component of the window), and the surfaces 134–135 may be described as facing outward (generally parallel to the glass component of the window).

A first downwardly facing surface or wall extends generally inward from the outermost surface 135, opposite the lower sill surface 135, and a screw pilot 136 is formed therein. A first inwardly facing surface or wall extends upward from the first downwardly facing surface to a second downwardly facing surface or wall. The second downwardly facing surface extends generally inward, and a groove 137 is formed therein to receive a nailing flange 183. A second inwardly facing surface or wall extends generally upward from the second downwardly facing surface and joins the upper sill wall 132. The aforementioned sidewalls cooperate to define hollow interiors 139a and 139b.

Both sides of each of the aforementioned sidewalls have been formed during an extrusion process and thus, are relative smooth. On the other hand, the end 138 of the sill frame member 130 has been cut and thus, is likely to have exposed wood fibers.

An end cap or cover 150 is secured to the cut end 138 of the sill frame member 130. The cover 150 is made of injection molded plastic and is sized and configured to effectively seal off the hollow interiors 139a and 139b of the sill frame member 130. A mirror image of the cover 150 is provided for an opposite cut end of the sill frame member 130.

The cover 150 is shown in greater detail in FIGS. 4–7. The cover 150 includes a first or main wall 151 having an inwardly facing surface 152. The perimeter of the first wall 151 corresponds to the perimeter of the hollow interiors 139a and 139b. A slot 153 is formed in the first wall 151 to coincide and align with the groove 137 on the sill frame member 130. A notch 154 is formed in the first wall 151 to coincide and align with the screw chase 136 on the sill frame member 110.

Prongs 155 are integrally connected to the inwardly facing surface 152. The prongs 155 extend perpendicularly inward therefrom and cooperate with the sill frame member sidewalls to align the cover 150 with the cut end 138 when the former is inserted into the latter. A screw chase or bridge 156 is also integrally connected to the inwardly facing surface 152. The screw chase 156 spans the height of the relatively outward interior 139a, as defined between the lower sill wall 133 and the screw pilot 136. The screw chase 156 also provides a vertically oriented hole through which a fastener is inserted to secure the side frame member 110 to the sill frame member 130 and the cover 150.

An energy director, in the form of a ridge 158, is positioned on the first wall 151, extending parallel to and just inside the perimeter thereof. The energy director 158 abuts the ends of the sill frame member sidewalls when the cover 150 is inserted into the hollow interiors 139a and 139b.

Transverse walls 161–164 extend perpendicular away from the inside surface 152. The transverse walls 161–164 extend parallel to and just inside the perimeter of segments of the ridge 158. Energy directors, in the form of fins or flanges 168, extend perpendicularly between the transverse walls 161–164 and the first wall 151, just inside of the energy director 158.

The window frame corner 100 is assembled by first extruding the frame member 130 from the composite material including plastic and wood fiber. The frame member 130 is then cut to length, thereby creating the cut end 138. The end cap or cover 150 is formed by plastic injection molding and is configured according to the geometry of the cut end 138.

With the cover 150 inserted into the cut end 138, an ultrasonic horn 190 is positioned proximate the cover 150 and directed perpendicular to the first wall 151, as shown in FIG. 2. The sound waves from the horn cause the energy directors 158 and 168 on the cover 150 to melt and form bonds between (a) the ends of the sill frame member sidewalls and the first wall 151 on the cover 150; and (b) the inwardly facing surfaces on the sill frame member sidewalls and the transverse walls 161–164 on the cover 150. During this welding process, the cover 150 moves closer to the cut end 138.

Although described with reference to specific methods and embodiments, the scope of the present invention is limited only to the extent of the claims which follow.

What is claimed is:

1. A corner joint for a window or door, comprising:
   a first frame member extruded from a composite material including wood fibers and plastic, the first frame member having a cut end and sidewalls disposed about a hollow interior;
   a plastic end cap sized and configured to insert between the sidewalls and seal off the cut end of the first frame member, the plastic end cap being sonically welded to the cut end, the end cap includes first energy directors disposed on a first surface which extends parallel to and overlies the cut end, and second energy directors disposed on a second surface which extends parallel to and nests within the sidewalls; and
   a second frame member connected to at least one of the end cap and the first frame member.

2. The corner joint of claim 1, wherein the second energy directors extend perpendicular to the second surface, the first surface, and the first energy directors.

3. The corner joint of claim 1, wherein the end cap further includes a screw chase connected to the first surface, and the screw chase is sized and configured to bridge a gap between opposing sidewalls on the first frame member and thereby reinforce same.

4. The corner joint of claim 1, wherein the end cap and the second frame member are discrete parts.

* * * * *